INVENTOR.
ALBERT M. BATES
BY Kenneth L. Miller
ATTORNEY

Sept. 6, 1966 | A. M. BATES | 3,271,741

MAGNETIC MEMORY SYSTEM

Filed Sept. 28, 1962 | 5 Sheets-Sheet 2

INVENTOR.
ALBERT M. BATES

BY Kenneth L. Miller
ATTORNEY

INVENTOR
ALBERT M. BATES
BY Kenneth L. Miller
ATTORNEY

INVENTOR.
ALBERT M. BATES
BY Kenneth L. Miller
ATTORNEY

Sept. 6, 1966 A. M. BATES 3,271,741

MAGNETIC MEMORY SYSTEM

Filed Sept. 28, 1962 5 Sheets-Sheet 5

INVENTOR.
ALBERT M. BATES
BY Kenneth L. Miller
ATTORNEY

United States Patent Office 3,271,741
Patented Sept. 6, 1966

3,271,741
MAGNETIC MEMORY SYSTEM

Albert M. Bates, Davisville, Pa., assignor to Burroughs Corporation, Detroit, Mich., a corporation of Michigan
Filed Sept. 28, 1962, Ser. No. 226,895
14 Claims. (Cl. 340—172.5)

This invention relates in general to magnetic memory systems of the type which are generally employed with computers. More specifically, this invention is an improvement in techniques for reading information from magnetic memory matrices and for storing new information or regeneratively writing back into the matrices the original stored information.

In advanced computers the speed of the memory often limits the computer operational speed. Mechanism for increasing the operational speed, therefore, requires a means of resolving this problem by utilizing a memory system with a faster cycle time. The problem of increasing memory cycle time is greatly emphasized when the total number of words as well as the bits per word becomes large. Inherent in large word storage memories are capactive and inductive noises which are generated in the drive and sense conductors of the matrices. In mangetic core memory matrices various schemes of wiring arrangements, such as checkerboard wiring, of the sense wire have been suggested in order to minimize certain types of false and undesired noise signals. In magnetic core arrangements the problem was particularly acute when the core material did not have a proper rectangular hysteresis loop characteristic. In modern day systems, the material in such cores has been improved. Additionally, a more recent trend towards improved memory matrix arrangements has lead to the development of thin film magnetic planes. The characteristics of the magnetic memory spots arranged in matrix form on planes may be controlled so as to present a very favorable hysteresis loop characteristic. Furthermore, the packaging techniques of such thin film memories permit a very compact assembly.

In an embodiment described in connection with this invention, such thin film memories are utilized. The use of thin film memories avoids the upper frequency characteristics of magnetic cores. At high frequencies magnetic cores suffer from hysteresis losses due to internal heating. Although such losses may be minimized by using smaller cores, this approach is met with difficulties due to the extremely difficult problem of interwiring resulting miniature elements.

In the modern thin film memory planes, the storage elements may utilize nickel-iron films having a thickness of approximtaely 2,000 angstroms. One successful form of arriving at such storage elements is by vacuum deposition onto a glass substrate under the influence of a magnetic field. Such deposited thin films remagnetize predominantely by a spin-rotational mechanism rather than by a domain wall movement. The spin-rotational switching is extremely fast and has been measured in the nanosecond range. Thin film memories with cycle times in the nanosecond range are now considered feasible. Additionally, the cost of fabricating thin film memory planes compares favorably to the high cost of wiring magnetic core memory planes. The individual discrete storage elements of thin film memory planes show a preferred or easy direction of magnetization with all domains of an area of each such storage element lying parallel to the direction of the magnetic field applied during deposition. Although the easy direction of magnetization of these elements exhibits a rectangular or square hysteresis characteristic, the perpendicular to the easy direction (called the hard direction) of the storage element exhibits a linear hysteresis loop. In the use of such thin film storage elements the stable storage states line up with the easy direction of magnetization and may be considered in the N and P states compared with a similar magnetic dipole in such states. These two N and P states may represent the storage of a binary "1" or "0."

A convenient form of operating upon thin film memory planes involves the columnar selection of a number of such spots or storage elements which may be considered to constitute a word. In the example used throughout this application, a word may be considered as including twenty-four bits.

In the described embodiment a selection overlapping in time of a word drive current and an information current permits the writing of word information into the respective bit positions of the memory. During such an operation, signals, which may be termed noise signals, are generated in each sense conductor. When it is desired to operate the memory at extremely fast speeds, such noise signals must be minimized in order to prevent their interfering with proper operation and their causing such operation to be slowed down.

One of the objects of this invention is to provide an improved memory system.

Another object of this invention is to provide a memory system which may operate at extremely high frequencies and in which noise signals are reduced so as to improve system operation and speed.

A still further object of this invention is to provide a memory system in which thin film storage elements may be operated in a rapid fashion thereby increasing the overall speed of operation over similar magnetic core memory schemes. Such an improved efficiency provides a better utilization of the computing portions of electronic computers.

Yet another object of this invention is to resolve the problem of higher frequency clock times associated with thin film memories by minimizing noise signals and by providing an efficient mechanism for interrogating selected words of memory planes and also for rewriting back into the same word location the information just sensed.

In the description of this invention which follows, the above objects are accomplished by providing a memory cycle which may operate in the nanosecond range utilizing circuitry in common both for writing information into a thin film memory plane and for reading information from such plane. The sense circuitry associated with such plane, in addition to providing appropriate output information, may also be utilized when regenerating the interrogated information back into the memory storage location.

The novel features of the invention as well as the invention itself, both as to its organization and method of operation, will best be understood from the following description when read in connection with the accompanying drawings, in which.

Figure 2A:
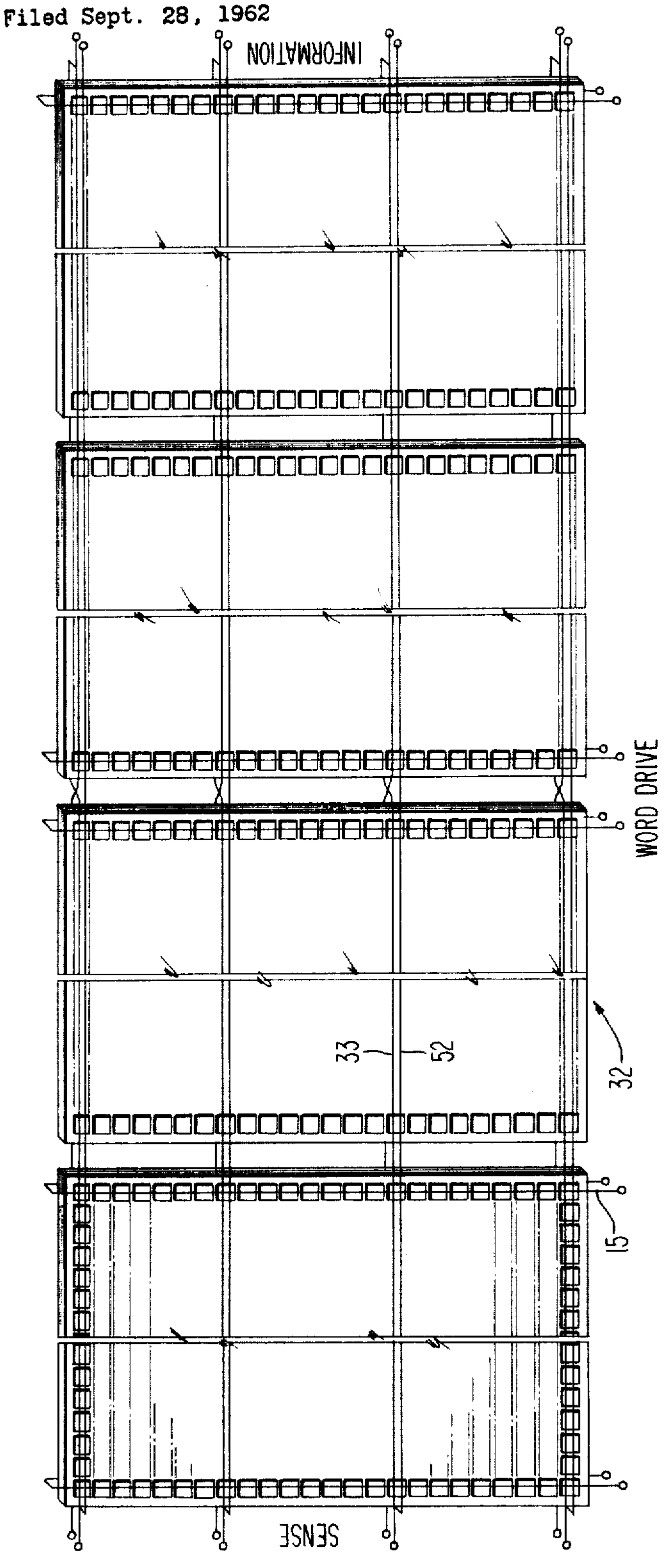
FIG. 2A is a pictorial presentation of a thin film memory matrix.

The principles of the memory system operation are best explained by the discussion of a single bit with reference to the thin film memory plane illustrated in FIG. 2A. Three conductors are associated with each storage bit or element. A word drive conductor is arranged substantially parallel to the preferred or easy direction of magnetization and an information and sensing conductor are arranged substantially parallel to the hard direction of magnetization. As is true in thin film memory planes sold by the assignee of this application, the information conductor may be split, having one-half of such conductor on opposite sides of the sense conductor in order to reduce the mutual capacitance between the information and sense conductors and to reduce eddy currents in the information conductor induced by the word drive current. A current in the word drive conductor generates a transverse field which, if greater than the saturation force in the hard direction, is believed to rotate the magnetic moments or dipoles to the hard direction. This rotation induces a sense signal of positive polarity if the rotation originated from the "1" state and of opposite polarity if it originated from the "0" state. To write or to magnetize an area of thin film to the "1" or "0" state, two magnetic fields perpendicular to each other are applied (the drive field lying in the hard direction and the information field in the easy direction). The resultant field lies somewhere between the easy and hard directions oriented towards either "1" or "0," depending upon the direction of the information field. Removal of the drive field allows the dipoles to fall towards the desired "1" or "0" state, after which the information field may be terminated. The time duration as well as the relative timing of such currents and the signals generated thereby may be more readily understood in connection with the timing diagram of FIG. 5 described hereinafter.

Figure 1:
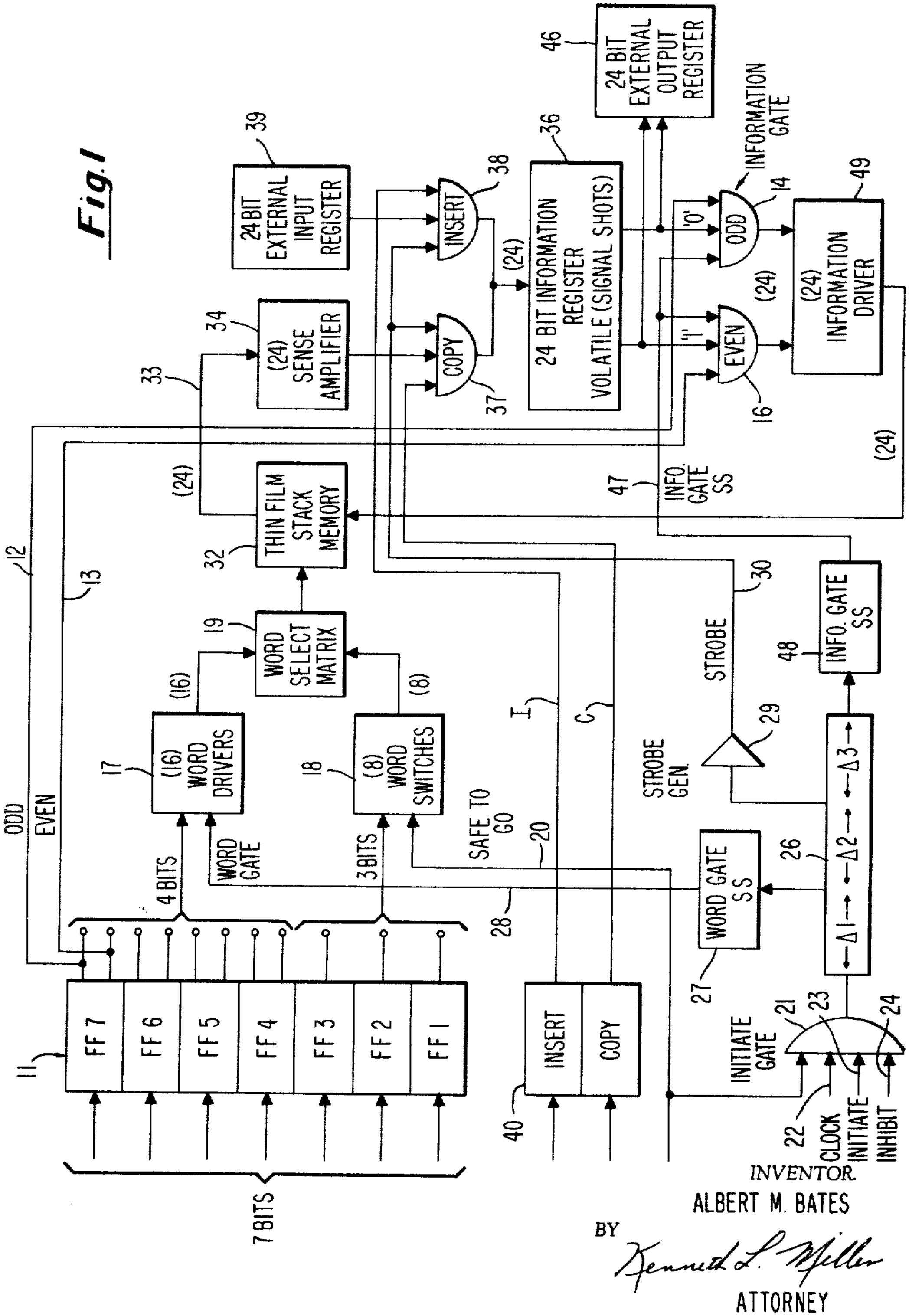
FIG. 1 represents a block diagram of an illustrative magnetic memory system.

Referring now to the block diagram of FIG. 1, an understanding of the system may be gained. The address register 11 is shown as including seven flip-flops designated FF1–FF7. Such flip-flops receive their input address and may be set in any one of one hundred and twenty-eight combinations. FF7 is the lowest order flip-flop and during sixty-four of the possible combinations, it is placed in one state, whereas is it placed in its opposite state during the remaining sixty-four combinations. The output of FF7 serves a dual function and provides an odd or even address signal over lines 12 and 13 for use in connection with the odd and even gates 14 and 16. The four lowest order address flip-flops are gated into sixteen word drivers 17. The three highest order flip-flops FF1–FF3 provide gated inputs to the eight word switches 18. The selected output lines from the word drivers 17 and the word switches 18 are arranged to provide column and row energization respectively for a word selection matrix 19. The matrix 19 may conveniently utilize one hundred and twenty-eight cross over points in the array with the cross over points including a typical transformer-diode combination. The column lines may be connected in common to one end of each of the primary transformer windings in the respective columns. The row lines may be conveniently connected through diodes to the opposite ends of the transformer primary windings of the respective row transformers. When a row and column line receive appropriate energization, the single diode located at the cross over point becomes forward conducting and a word drive current pulse may be generated at the selected transformer secondary winding. In the illustrative form of FIG 2A, it may be seen that the selected one of one hundred and twenty-eight word drive conductors 15 is associated with twenty-four bit positions which make up the word. The timing of output currents from the word drivers and word switches is under control of an external initiate mechanism and clock pulse source. A safe-to-go pulse is appropriately timed and is applied as an input to the word switches 18 along line 20. This pulse is likewise applied as one input to an initiate gate 21. Gate 21 is an AND gate which also receives a clock pulse along line 22 and a number of other voltage levels such as pr vided along lines 23 and 24, which may serve as interloc or controls upon the operation of the memory matr When all four inputs are present at AND gate 21, output is provided to a delay line 26. In a typical a rangement as constructed in accordance with the teachi of this invention, the delay line was made up of thirt three separate delay sections, each providing a ten nar second delay time. This timing enabled the system operate with a 3 megacycle clock pulse source. Tapp off along the delay line 26 at an appropriate point, an ou put causes a word gate single shot multivibrator 27 to l activated. This gate 27 (univibrator) is controlled in i time duration by the circuit parameters to provide a wo gating signal along line 28 as a further input to the gat word drivers 17. A further tap associated with del line 26 enables a strobing generator 29 to provide a strol pulse along line 30 for use in properly timing the sampli of signals from sense amplifiers 34 or external inp register 39.

Figure 3:
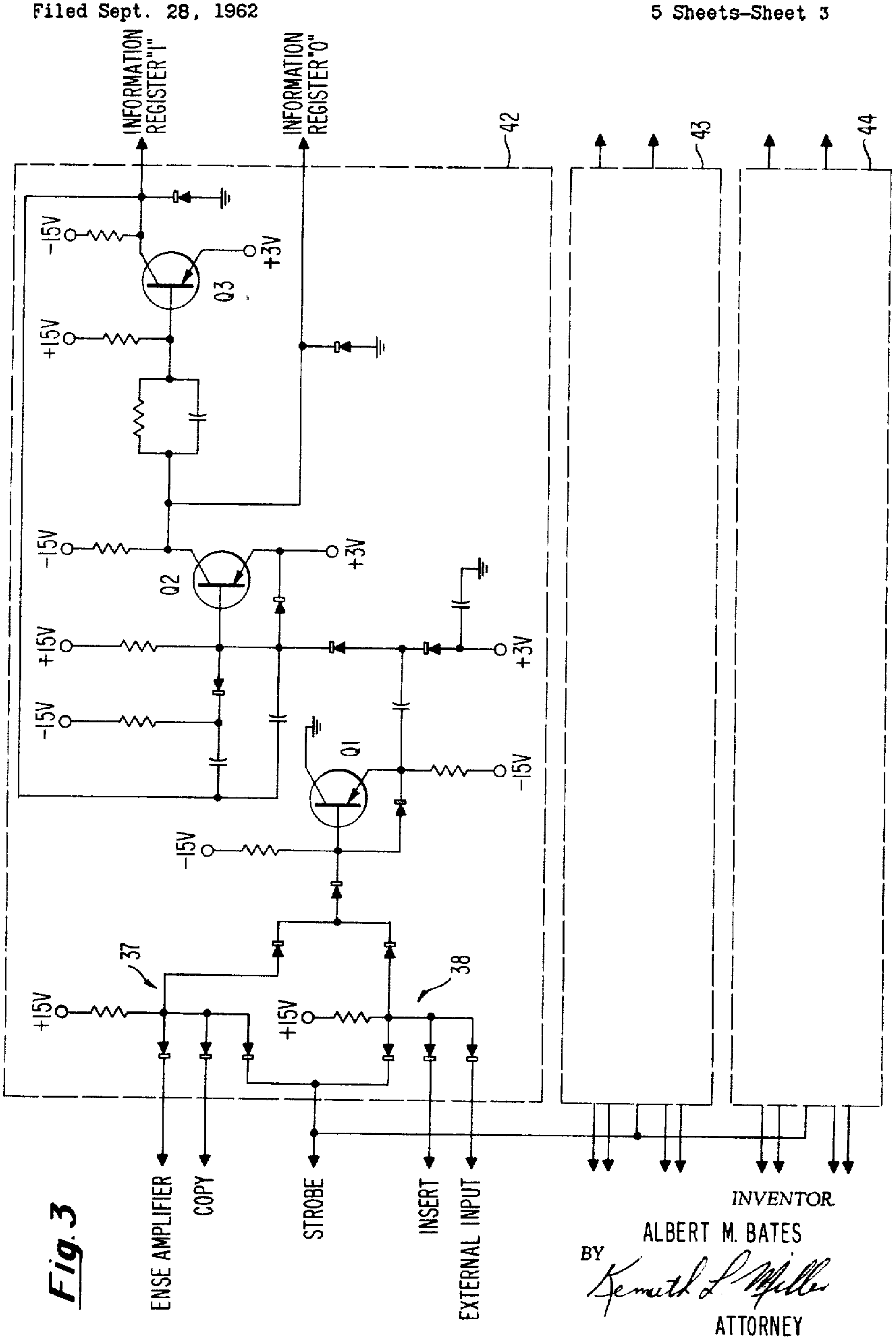
FIG. 3 is a schematic diagram of a representative information register, with its input copy and insert gate, of a type which may be incorporated into the overall block presentation of FIG. 1.

As has been described hereinabove, when a single tran former of the word select matrix is energized, an outp current is provided from a secondary transformer windi and is applied as the word current to a word drive colum conductor associated with selected twenty-four discre storage elements which make up a word of a memory 3 This may be seen more effectively in the presentation FIG. 2A. Presence of word current to the thin film mem ory causes a rotation of the magnetic moments to tl hard direction of magnetization. A sense signal of eith positive or negative polarity is generated dependent upc the original remanent state of magnetization of each the selected storage elements. The respective sense si nals are generated along sense conductors 33 to the r spective sense amplifiers 34. When properly amplifie and clipped, the sense amplifiers may provide either pulse or no pulse to represent respective "1" and "0" co ditions. These signals are directed to the twenty-four b information register 36 through a copy AND gate 3 The appropriate inputs to the twenty-four bit informatio register may also be provided through insert gate 38 fro an external input register 39, if new information is to t written into the thin film memory. Control for the cop and insert gates 37 and 38 is furnished from a flip-flop 4 which in one of its states conditions the copy gate, whil in the other of its conditions the insert gate over lin designated C and I. The copy and insert gates as seen i FIG. 3 are generally referred with the same designatio 37 and 38. One such gate is provided for each of th twenty-four information registers. The inputs to eac AND gate 37 may be seen as including a strobe puls from strobe generator 29 and copy pulse from the cop insert flip-flop 40 as well as the amplified and clippin output from the sense amplifier. AND gate 38 receiv its input from strobe generator 29, from an external inp register 39, and from the insert line of the copy-inse flip-flop 40. Only one of these gates may be activate during one time cycle. An output from either gate 3 or 38 controls the conduction of transistor Q1 to caus a single shot multivibrator including transistors Q2 an Q3 to generate an output along the appropriate informa tion register line "1" or "0." One of the twenty-four bi information registers 42 is completely illustrated, wherea two other of the registers 43 and 44 are illustrated i phantom for ease of presentation and understandin The output from the univibrator, including transisto Q2 and Q3, may be directed to a twenty-four bit extern output register 46 for appropriate untilization. In add tion to providing an output, the information register serve to provide an input of information current to the info mation conductor of the thin film memory for writin an appropriate word into the memory. Such word ma either be that which was just read out of the memory o a new word which is just being inserted from the extern register 39. The information register utilizes a univibra tor rather than a bistable flip-flop device in order to make the most efficient use of available time. This is required since the overall cycle time may be in the nanosecond range and further limitations are placed upon the system when there is a need to reset bistable flip-flop devices.

Even gate 16 receives an input from the "1" output side of the univibrator Q2–Q3. It is appropriately timed with a further input along line 47 from an information gate single shot multivibrator 48. This multivibrator is under control of the delay line 26. The third illustrated input to even gate 16 is from line 13 of FF7 of the address register 11. Thus, when an even address has been set up in register 11, the even gate 16 is appropriately energized to write into the memory 32 by means of the information driver 49. On the other hand, when an odd address has been indexed into register 11, then the odd side 14 of the information gate provides an input to the information driver 49 under control of the single shot multivibrator 48 and the "0" side of the information register 36. A better understanding of the even and odd information gates may be had by reference to FIG. 4. Phantom outline 50 encompasses one of the twenty-four information drivers as well as the even and odd infromation gates. Outline 51 shows a second of twenty-four such information driver and gate combinations with external connections only for ease of illustration and clarity of understanding.

As may be seen from block 50, there are two generators, one including transistors Q4–Q7 and a second including transistors Q8–Q10. The Q4–Q7 generator permits current flow along output line 52 in a right to left direction designated I EVEN, whereas the generator including transistors Q8–Q10 permits current in a left to right direction designated I ODD along output line 52. Again only one of these generators in each of the blocks 50, 51 and the remaining of the twenty-four information drivers is energized at any one time. The selection of which of the two respective generators is energized is under control of the input AND gates 14 and 16. The input line to these gates, marked information gate, is furnished over line 47 from the univibrator 48 and is a timing pulse. The appropriate information register line "1" or "0" is under control of the "1" or "0" output furnished from the information register 36, the circuit of which is shown in FIG. 3. Finally, the third input for gates 14 and 16 comes from odd or even lines 12 and 13 under control of FF7 of the address register 11. When appropriately gated, the information driver provides current in one direction or the other along lines 52 to the information conductors of the thin film memory 32. An understanding of the manner of writing information into a selected word position of the memory is described hereinafter in conjunction with the timing chart of FIG. 5.

Figure 5:
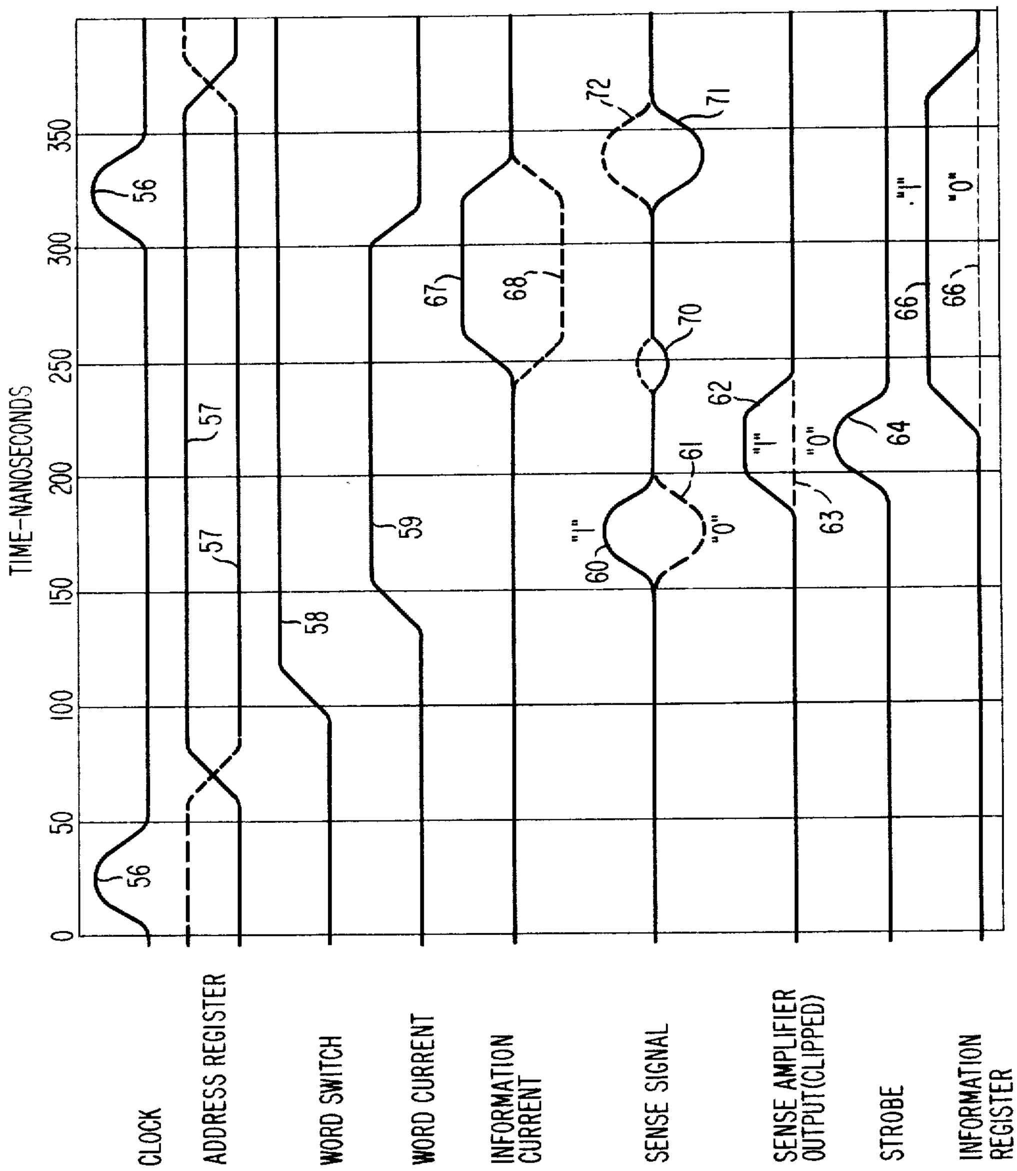
FIG. 5 is a timing chart of a typical system operation such as is illustrated in the FIG. 1 block presentation.

In operation of the system, FIG. 5 shows that a clock pulse 56 appears approximately every 300 nanoseconds. The clock may serve as one of the inputs 22 of initiate gate 21 to serve as an input to the delay line 26 which thereafter controls the timing of the read-write cycle of this memory system. As has already been indicated, gate 21 also receives a safe-to-go signal as well as further inputs from appropriate interlocks and controls associated with the remainder of the computer assembly. Before the clock pulse in point of time, the seven bits of input address information appear at the input of address register 11 to set the respective flip-flops FF1–FF7, the output being indicated by levels 57 of FIG. 5. The word switches 18 are gated with the safe-to-go input as well as the output states of FF1–FF3 of register 11. The word switches 18 provide a partial selection of one out of eight rows of the matrix 19, as indicated by the word switch level 58. The address flip-flops FF4 through FF7 select one column of the matrix 19 by means of the word drivers 17, which in turn are gated along line 28 from the univibrator 27. Word current 59 is permitted to flow, reaching its full current level at approximately 150 nanoseconds in the presented example. The seven bit address register is therefore capable of selecting one of one hundred and twenty-eight word drive conductors for the thin film memory 32. Current flowing through the selected word drive conductor rotates the magnetic moments to the hard direction inducing a "1" or a "0" signal 60 or 61. These respective signals picked up along the twenty-four sense conductors are amplified and clipped through an appropriate sense amplifier to give a "1" or "0" output 62 or 63 from the respective amplifiers 34. The timing of the delay line is such that a strobe pulse is provided along line 30 at the mid portion of the amplified sense signal. Such strobe pulse is designated 64 in the figure.

When it is desired to read out of the selected word position of the memory and to regenerate the sensed word back into the memory, flip-flop 40 is set to a copy state. The combination of the copy level of the flip-flop 40, the strobe pulse 64, and the amplified output pulse 62 or 63 causes the respective information register to reside for a predetermined time period in its "1" or "0" output state. The shift in the single shot multivibrator of the information register is illustrated by waveforms 66 of the figure. This shift in the information register may be utilized to trigger the twenty-four bit external output register or indicator.

In writing back into the memory, either the even or odd information gate 16 or 14 is energized along with the even or odd control form address register 11 and the third input furnished from the single shot multivibrator 48. These respective inputs cause the information generator Q4–Q7 or Q8–Q10 to cause current flow along information conductor 52 in one direction or the other, as illustrated in waveform 67 and 68. It will be remembered that the address register 11 is still set up in the FF1–FF7 conditions and that word select current is still furnished along the selected word drive conductor, as shown in waveform 59. The combination of current through the selected word drive conductor and current through the information conductor 52 causes the resultant field to lie between the hard and easy direction oriented toward either a "1" or a "0," depending upon the direction of the information field. The word current may then be removed permitting the dipoles to fall towards the desired "1" or "0" state after which the information field can also be terminated as is clearly shown.

Figure 2B:
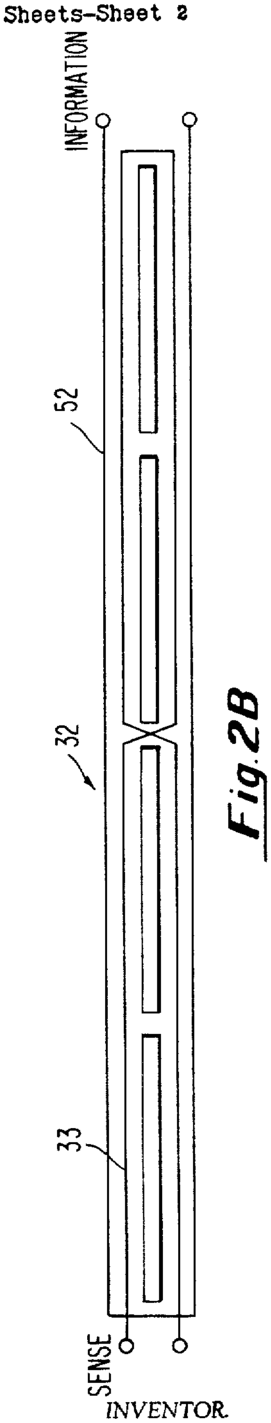
FIG. 2B is a pictorial front elevational view of the memory matrix of FIG. 2A.
Figure 4:
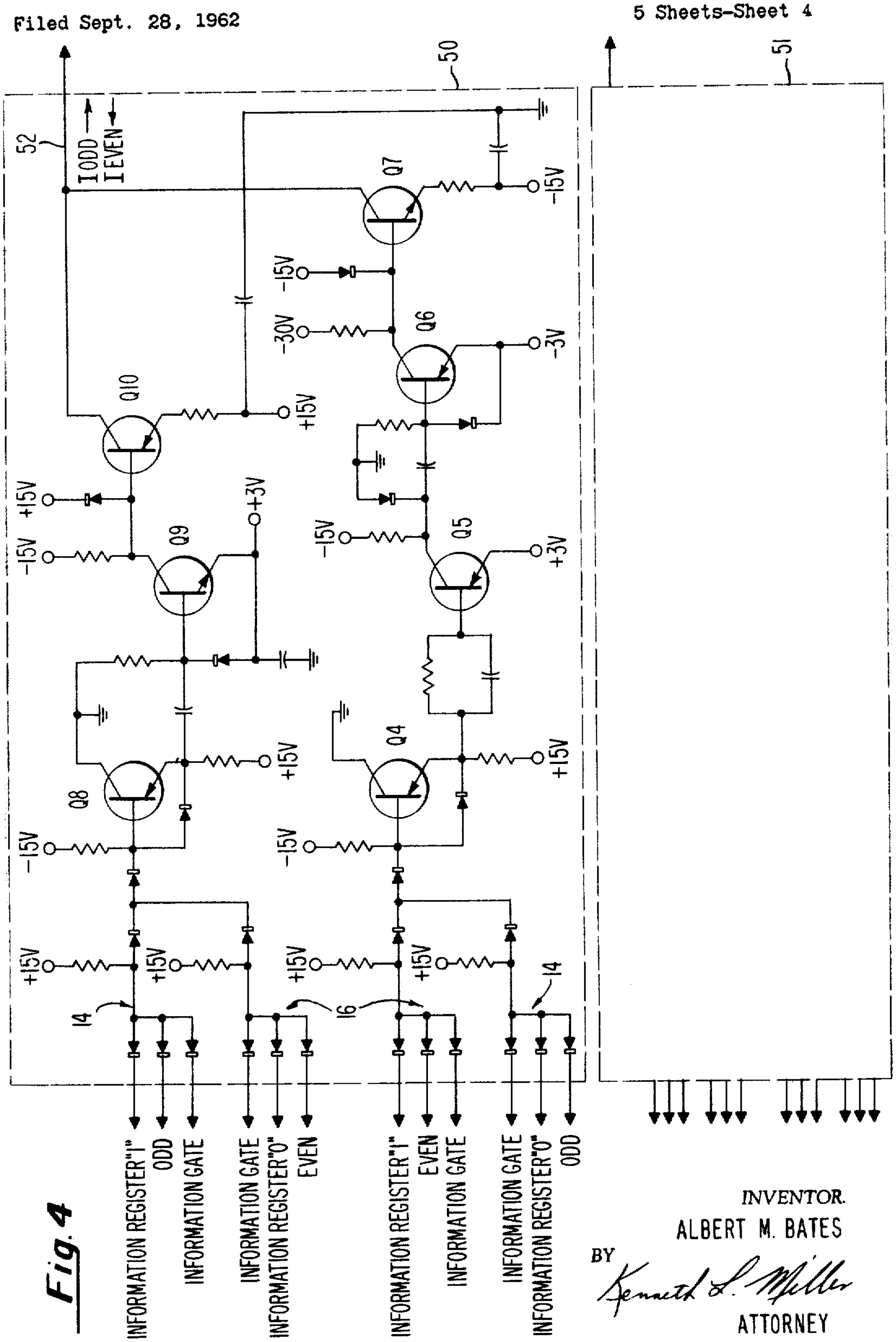
FIG. 4 is a schematic diagram of a representative information driver, with its even and odd information gates, of a type which may be incorporated into the overall block presentation of FIG. 1.

At the beginning of the information current pulse a noise signal 70 is seen as being developed on the sense line. This signal results from inductive coupling to the sense conductor and should be minimized. In the present invention, the assembled memory plane has its sense and information conductors interconnected in a noise-canceling manner. This is done so that the sense signal will not contain the noise induced by the information current. Interposing the sense conductor with respect to the information conductor reduces the noise generated during the write operation and permits the memory cycle to be shortened. This is desirable in a high speed system of the type described wherein recovery time of a blocked amplifier is extremely important and may contribute toward slowing down of total cycle time. Reference to FIG. 2B of the drawings will show that the sense conductor 33 is interposed with respect to the information conductor 52 insofar as half of the information words are concerned. It will be understood that the logic circuits for the information driver therefore have to be arranged so that a "1" may be written as a "0" in half of the memory address positions, and a "0" written as a "1" in those same memory positions. The selected memory positions identified by the transposed sense conductor are under control of the even and odd states of FF7. These states, over lines 12 and 13, control the even and odd information gates 16 and 14. As an example of operation of the even and odd gates, when a signal has been read from a single bit position of a selected word, if it causes the information register to reside in a "1"

state and if the address of that information is an odd address, upper gate 14 of FIG. 4 will be selected and current will be permitted to pass to the right along information line 52. On the other hand, if the information register has just registered a "1" and the address is an even address, then the lower gate 16 will be energized and current will pass from right to left along information conductor 52, as shown in FIG. 4. The remaining operations of gates 14 and 16 in conjunction with the transposed sense and information conductors will be seen to follow through accordingly.

When the word current 59 terminates, a non-useable sense signal 71, 72 will be generated. Furthermore, when the information current thereafter terminates, it will also generate a noise signal in the sense conductor which will add algebraically to the sense signal 71, 72 with the indicated timing. It has been found that the noise cancel feature of this invention permits a sense amplifier to recover quickly enough so as to be available during the next successive cycle to furnish desired sense information.

In the light of the preceding detailed disclosure of an exemplary memory system according to the invention, it will be evident to those skilled in the art that changes and modifications may be made without departing from the spirit and concept of the invention; and accordingly it is not desired to be limited to the exact details of the example described. For example, it is understood that the information conductor may be twisted instead of the sense conductor with the even and odd logic associated with the sense amplifiers.

What is claimed is:

1. A memory system comprising, in combination, a memory array having rows and columns of bistable state magnetic elements, said array having an even and an odd address portion, input means providing drive current to a selected even or odd address portion, sensing means for detecting "one" or "zero" output information resulting from said drive current, circuit means responsive to said sensing means for directing said sensed output information to an information register, means including an even or odd information gate regenerating said sensed output information back into said memory array at said selected address portion, the output of said even or odd information gate causing an information driver to provide rewrite current in a first or a second direction at said selected address portion, said first or second rewrite current direction being under the control of said even or odd information gate so as to cause said bistable state magnetic elements to be placed in a first reference state in said even address portion and in a second reference state in said odd address portion when storing identical binary information.

2. The memory system as recited in claim 1 wherein said even or odd information gate is controlled by an even or odd address portion furnished to said input means.

3. A memory system comprising, in combination, a thin film memory array including rows and columns of discrete thin film magnetic memory elements, said array having an even and an odd address portion, input means providing word select drive current to a selected column in said even or odd address portion, means providing an information signal pattern from said selected column, gating means for directing said information signal pattern to an information register, means generating information current into said thin film memory array at said selected column including an even or odd information gate, the output of one of which causes an information driver to provide write current in a first or a second direction at said selected address portion, said first or second write current direction being under the control of said even or odd information gate so as to cause said magnetic memory elements to be placed in a first reference state in said even address portion and in a second reference state in said odd address portion when storing identical binary information.

4. The memory system as recited in claim 3 wherein said even or odd information gate is controlled by an even or odd address portion furnished to said input means.

5. A memory system comprising, in combination, a thin film memory array including rows and columns of discrete thin film magnetic memory elements, said array having an even and an odd address portion, a plurality of word drive conductors coupled to respective columns of said memory elements, a plurality of information conductors and a plurality of sense conductors coupled to respective rows of said memory elements, the easy direction of magnetization of said memory elements being substantially aligned with said column word drive conductors, the relative direction of mutual coupling between said information and sense conductors being reversed in the even and odd address portions of said array, input means providing word select drive current to a selected column in said even or odd address portion, even or odd information gate means controlled by said input means in accordance with the location of said selected column in said even or odd address portion, sense amplifier means connected to said sense conductors, information drive means connected to said information conductors for storing appropriate states at said selected column of said array, means under control of said even or odd information gate means for permitting proper output signals from said sense amplifier means whether said selected column is in said even or odd address portion.

6. A memory system as defined in claim 5 wherein said even or odd information gate means causes said information drive means to provide current in one direction or the other through said respective information conductors when storing identical binary information, such direction being dictated by the selected even or odd address.

7. A memory system as defined in claim 5 wherein said information drive means may be selectively controlled by a copy or insert gate to either regenerate into said selected column information just interrogated or to write new information into said selected column.

8. A memory system comprising, in combination, a thin film magnetic memory array including discrete information bit elements, each element capable of having bistable state storage conditions, one representing a one and a second representing a zero, said array including an even and an odd address portion, each said portion including a number of words with a plurality of bits per word, said bistable storage elements having a preferred or easy direction of magnetization and a hard direction of magnetization, a plurality of word select drive conductors oriented in columns substantially along said easy direction of magneization of a number of discrete storage elements making up each of said words, a plurality of sense conductors and a plurality of information conductors oriented substantially along said hard direction of magnetization as row conductors, with one each of said sense conductors and said information conductors associated with each of the bit elements of said selected word, said sense conductors being transposed with respect to said information conductors in the respective even and odd address portions of said array, means selecting a single of said word drive conductors and providing current therein generating respective sense signals along said sense conductors, the polarity of said signals being indicative of the respective bit information states, even and odd information gates under control of an input address determining whether said even or odd address portions of said array have been selected to thereby cause an information driver associated with each of said information conductors to cause current to flow in respective first or second directions through said information conductors depending upon the polarity of sensed output signal as well as the even or odd address portion of said array whereby "one" information bits are written into an even address portion as "one" signals and "one" information bits are written into said odd address portion as "zero" information signals, the transposing of said sense and information conductors enabling noise cancellation in said sense conductors in response to said respective information currents.

9. A memory system comprising, in combination, an array of rows and columns of discrete thin film memory elements, word select drive conductors coupled to columns of said elements, sense and information conductors coupled to rows of said elements, a word select register having a plurality of stages for entering an address of a selected word column, decoding drive means connected to said word select register providing drive current to a selected one of said word columns, initiate control means for timing said drive current, sense amplifier means connected to said row sense conductors, an information register connected to said sense amplifier means, even and odd information gate means under control of said information register and selected by one of the stages of said word select register to cause energization of said information conductors, said information gate means permitting a pattern of "ones" and "zeros" to be written into said selected column in a first manner under control of an even information gate and in a complementary manner under control of an odd information gate.

10. A memory system as defined in claim 9 wherein said initiate control means includes a timing delay means providing a strobe signal to sample said sense amplifier means at a predetermined time and a timing signal to thereafter enable said selected even or odd information gate.

11. A memory system as defined in claim 9 wherein said information register comprises a plurality of volatile or single shot multivibrators equal in number to the number of bits in a selected word column and wherein said selected even or odd information gate receives a clocking signal at a predetermined time.

12. A memory system as defined in claim 9 wherein said thin film memory elements have an easy and a hard direction of magnetization with said drive conductors substantially aligned along said easy direction of magnetization, said drive current for said selected drive conductor terminating prior to the termination of energization of said information conductors.

13. A memory system as defined in claim 9 wherein said even and odd information gate means include for each information conductor an even and odd diode network for a first information current generator and an even and odd diode network for a second information current generator, said first and second current generators having their outputs connected in common to said information conductor whereby energization of one of said diode networks by an even or odd address and by a predetermined output from said information register causes current to flow in said information conductor in a first or second direction.

14. A memory system as defined in claim 9 including gating means between said sense amplifier means and said information register whereby an external input may be gated into said information register in lieu of the read-out signals from said sense amplifier means.

No references cited.

ROBERT C. BAILEY, *Primary Examiner.*

P. J. HENON, *Assistant Examiner.*